United States Patent Office 3,324,273
Patented June 6, 1967

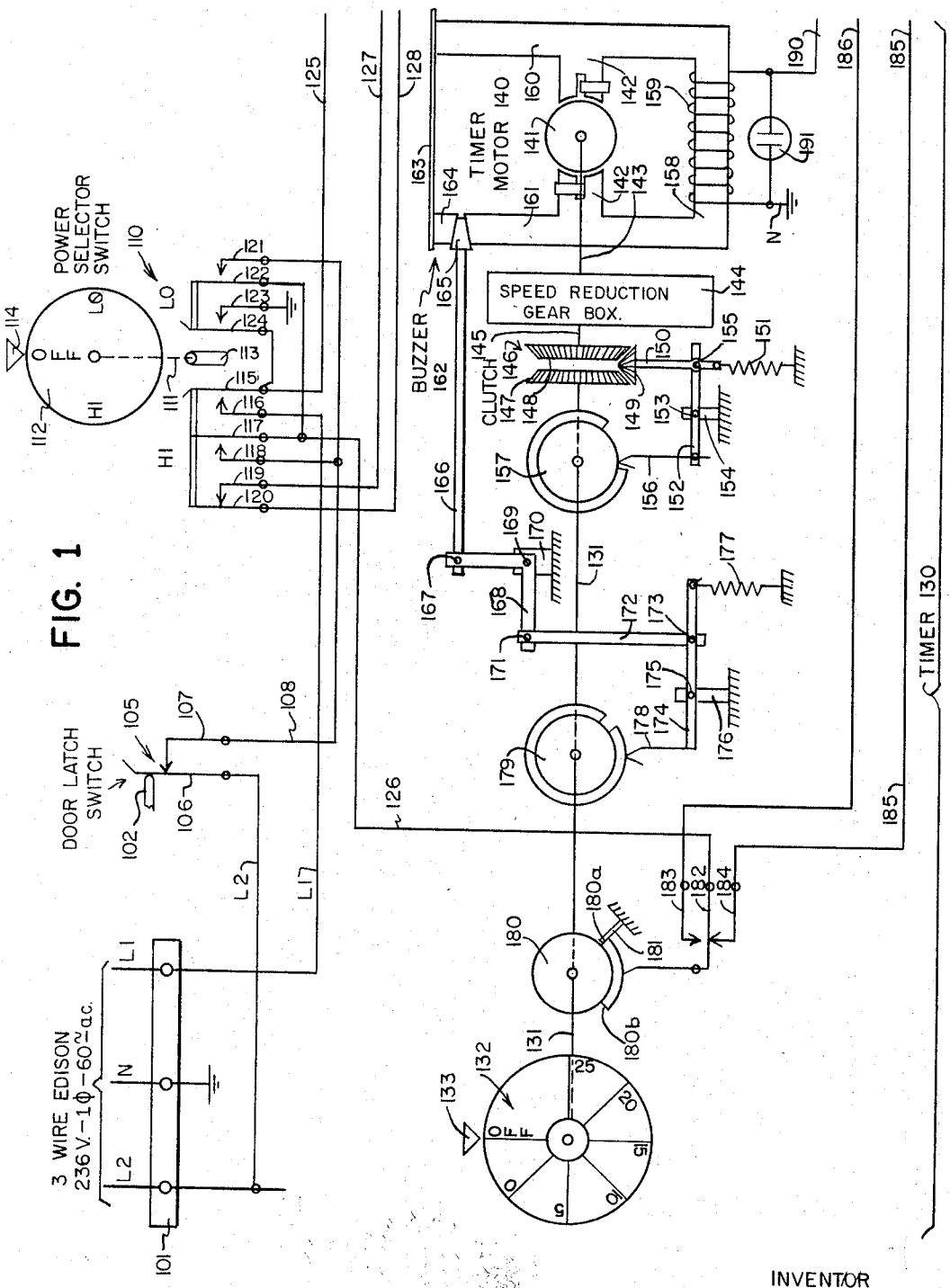

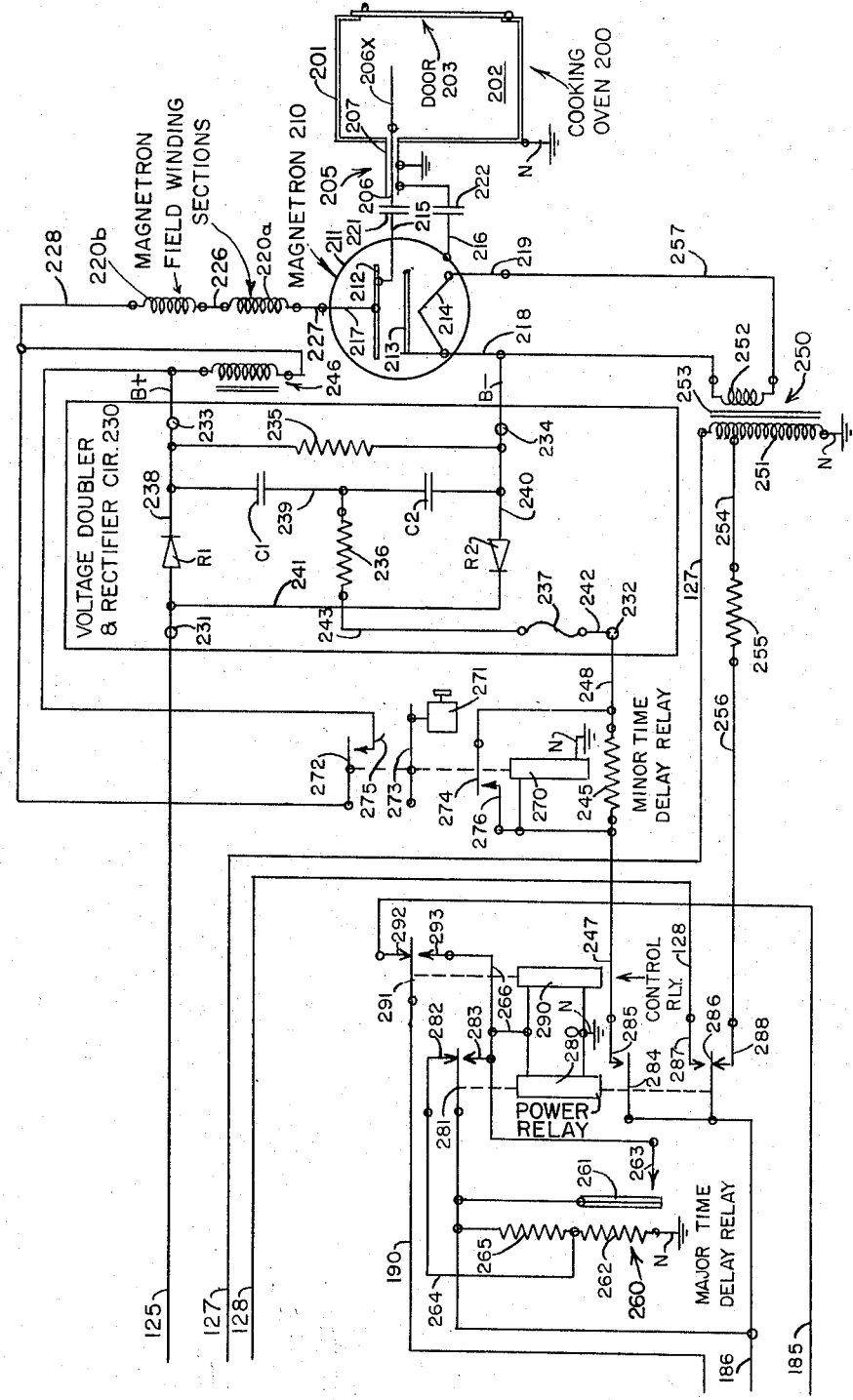

3,324,273
CONTROL AND POWER SUPPLY NETWORKS FOR MAGNETRONS
Robert D. Ogburn, Louisville, Ky., assignor to General Electric Company, a corporation of New York
Filed Aug. 7, 1964, Ser. No. 388,244
14 Claims. (Cl. 219—10.55)

The present invention relates to control and power supply networks for magnetrons incorporated in electronic cooking ovens, and it is a general object of the invention to provide an improved such network of the fundamental connection and arrangement at disclosed in the copending application of James E. Staats, Ser. No. 181,144, filed Mar. 20, 1962.

In the Staats application, Ser. No. 181,144, there is disclosed a power supply network, including a voltage doubler and rectifier circuit, and incorporating a low-voltage megnetron of the construction and arrangement as disclosed in the copending application of James E. Staats, Ser. No. 283,355, filed May 27, 1963, and constituting a division of the Staats application, Ser. No. 181,144.

While the Staats circuit network is highly advantageous for running the Staats low-voltage magnetron, the same is not ideally suited for starting this low-voltage magnetron, since the voltage doubler and rectifier circuit has an inherently low impedance. While a low impedance supply circuit is highly advantageous for running this low-voltage magnetron, it is not altogether suitable for starting oscillation of this low-voltage magnetron. Specifically, incident to starting of this magnetron, the time rate of current change through the field winding sections thereof is so great that a very large inductance is represented by the field coil sections; whereby the voltage drop across the field coil sections corresponds to a dominant fraction of the supply voltage, with the result that the anode-cathode voltage available from the supply source is sometimes inadequate to initiate oscillation of the magnetron. This peculiarity is caused fundamentally by the circumstance that the field winding sections of the magnetron are arranged in series relation with the anode-cathode of the magnetron, and connected across a power source that inherently has a low impedance.

Accordingly, it is another object of the present invention to provide in a control and power supply network of the character noted, facility for selectively increasing the impedance of the voltage doubler and rectifier circuit during the starting of oscillation of the magnetron supplied with power therefrom.

Another object of the invention is to provide in a control and power supply network of the character noted, facility for selectively increasing the impedance of the circuit that is supplied by the voltage doubler and rectifier circuit and that includes the magnetron during the starting of oscillation of the magnetron.

A further object of the invention is to provide in a control and supply network for a magnetron incorporated in an electronic cooking oven, an improved and simplified control system for governing a preset timed cooking operation involved and for signalling the cook upon the termination of the preset time interval of the cooking operation mentioned.

Further features of the invention pertain to the particular arrangement of the elements of the circuit control and power supply network for the magnetron incorporated in the electronic cooking oven, whereby the above-outlined and additional operating features thereof are attained.

The invention, both as to its organization and method of operation, together with further objects and advantages thereof, will best be understood by reference to the following specification, taken in connection with the accompanying drawings, in which:

FIGURES 1 and 2 taken together, and respectively arranged left and right and in end-to-end relation, comprise a diagrammatic illustration of a circuit control and power supply network for a magnetron incorporated in an electronic cooking oven and embodying the present invention.

Referring now to FIGS. 1 and 2, the circuit control and power supply network there illustrated, and embodying the features of the present invention, is of the fundamental connection and arrangement of that disclosed in the previously mentioned Staats application, Ser. No. 181,144; and the network essentially comprises a magnetron 210 of the construction and arrangement of that disclosed in the previously mentioned Staats application, Ser. No. 283,355. Specifically, the magnetron 210 comprises a substantially cylindrical metal envelope 211, structure 212 enclosed in the envelope 211 and constituting an anode, structure 213 enclosed in the envelope 211 and constituting a cathode, a heater 214 enclosed in the envelope 211 and operatively associated with the cathode 213, an output terminal 215 directly connected to the anode 212 and extending out of the envelope 211, an output terminal 216 directly connected to the metal envelope 211, an input terminal 217 directly connected to the anode 212 and extending out of the envelope 211, and an input terminal 218 directly connected to the cathode 213 and extending out of the envelope 211.

The magnetron 210 is operative to supply ultra-high frequency of about 915 mc., with a power output at the output terminals 215 and 216 in the general range 80 to 2400 watts. Specifically: at a plate voltage of about 200 volts D.C., the magnetron 210 has a continuous R.F. power output of about 100 watts at the ultra-high frequency of 915 mc.; at a plate voltage of about 570 volts D.C., the magnetron 210 has a continuous R.F. power output of about 700 watts at the ultra-high frequency of 915 mc.; and at a plate voltage of about 1,000 volts D.C., the magnetron 210 has a continuous R.F. power output of about 2400 watts at the ultra-high frequency of 915 mc.

The magnetron 210 is arranged to supply the R.F. power to a cooking oven 200 that comprises a substantially box-like metal shell or liner 201 defining a cooking cavity 202 and having a front opening provided with a cooperating front door 203; the front door 203 being selectively operative between open and closed positions with respect to the cooperating front opening in a conventional manner. More particularly, a transmission line 205 extends from the magnetron 210 to the cooking oven 200; the transmission line 205 being of the coaxial type including an inner conductor 206 and an enclosing outer conductor 207 electrically insulated therefrom. Both of the output terminals 215 and 216 of the magnetron 210 are at a substantial voltage D.C. with respect to ground potential, so that the output terminals 215 and 216 are electrically insulated from ground potential, as well as from each other. The output terminal 215 is coupled by a condenser 221 to the adjacent end of the inner conductor 206; the output terminal 216 is coupled by a condenser 222 to the adjacent end of the outer conductor 207; the remote end of the inner conductor 206 projects as an antenna 206x into the oven cavity 202; the remote end of the outer conductor 207 is electrically connected to the metal liner 201; and the outer conductor 207 and the metal liner 201 are electrically connected to ground potential or "grounded-out," as indicated. Thus the R.F. power produced by operation of the magnetron 210 is radiated from the antenna 206x into the cooking cavity 202, so as to produce cooking effects upon food arranged therein, all in a conventional manner. In the magnetron 210, one terminal of the heater 214 is electrically connected to the input terminal 218, and the other terminal of the heater 214 is electrically connected to a heater terminal 219 that projects out of the envelope 211. Further the magnetron 210 comprises a composite field winding including two sections 220a and 220b connected in series relation by a conductor 226. The input terminal 217 that is connected to the anode 212 of the magnetron 210 is connected by a conductor 227 to the free terminal of the field winding section 220a, and the free terminal of the field winding section 220b is connected to a conductor 228.

Also, the circuit network comprises an insulating terminal block 101 terminating a source of power supply of the 3-wire Edison type and including a neutral line N that is electrically connected to ground potential, and a pair of outside lines L1 and L2 that are electrically insulated from each other and from the neutral line N. Operatively associated with the front door 203 of the cooking oven 200 is latching mechanism indicated at 102, which latching mechanism 102 is selectively operative into latch and unlatch positions with respect to the liner 201, when the front door 203 occupies its closed position with respect to the cooperating front opening. Associated with the latching mechanism 102 is a door latch switch 105 that includes a pair of switch springs 106 and 107. In the arrangement, the door latch switch 105 is selectively operated between closed and open positions in response to the operation of the latching mechanism 102 into its respective latch and unlatch positions. Specifically, operation of the latching mechanism 102 into its latch position operates the door latch switch 105 into its closed position, moving the switch spring 106 to engage the switch spring 107. In the arrangement, the switch spring 106 terminates the line conductor L2, and the switch spring 107 terminates a conductor 108.

A power selector switch 110 is incorporated in the circuit network; which power selector switch 110 comprises a rotatable operating shaft 111, a manual dial 112 operatively connected to the outer end of the shaft 111, and an insulator 113 operatively connected to the inner end of the shaft 111. The power selector switch 110 has off, high and low positions; whereby the dial 112 carries the corresponding legends "off," "Hi" and "Lo"; and which legends cooperate with an associated stationary marker 114. Also, the power selector switch 110 comprises a set of high power switch springs 115, 116, 117, 118, 119 and 120 and a set of low power switch springs 121, 122, 123 and 124; which sets of switch springs are selectively operated by the cooperating insulator 113. Specifically: when the dial 112 occupies its "off" position, the pairs of switch springs 115, 116 and 117, 118 are disengaged and the pair of switch springs 119, 120 is engaged, and the pairs of switch springs 121, 122 and 123, 124 are disengaged. When the dial 112 is rotated into its "Hi" position, the insulator 113 actuates the switch springs 115 and 117 to engage the switch springs 116 and 118, respectively, and actuates the switch spring 120 to disengage the switch spring 119. When the dial 112 is rotated into its "Lo" position, the insulator 113 actuates the switch springs 124 and 122 to engage the switch springs 123 and 121, respectively. In the arrangement, the switch springs 115 and 124 commonly terminate a conductor 125, the switch spring 116 terminates the line conductor L1, the switch springs 117 and 122 commonly terminate a conductor 126, the switch springs 118 and 121 commonly terminate the conductor 108, the switch spring 123 terminates the neutral line N, and the switch springs 119 and 120 terminate conductors 127 and 128, respectively.

Further, the circuit network comprises a timer 130 that includes a rotatably mounted operating shaft 131 carrying a manually operable dial 132 on the outer end thereof; which dial 132 carries the index "off" and the numerical indices "0," "5," "10," etc., and "25"; which indices cooperate with a stationary index marker 133. Also, the timer 130 comprises a timer motor 140 of the synchronous or clock type, including a rotor 141 and a cooperating pair of pole pieces 142, the rotor 141 being rigidly secured to a rotatably mounted operating shaft 143. The operating shaft 143 is operatively connected to a speed reduction gear box, indicated at 144; which gear box 144 is provided with an output shaft 145. The operating shaft 131 and the output shaft 145 are arranged in longitudinal axial alignment with each other and are selectively interconnected by clutch mechanism 146 including two longitudinally spaced-apart gears 147 and 148 rigidly connected to the adjacent ends of the shafts 131 and 145, respectively, as well as a pinion 149 carried by a laterally movable stub shaft 150; which pinion 149 is adapted to engage the two gears 147 and 148 when the clutch mechanism 146 occupies its clutch position; and which pinion 149 is adapted to disengage the two gears 147 and 148 when the clutch mechanism 146 occupies its declutch position. The stub shaft 150 is biased by a cooperating coil spring 151 into a declutch position, so as to move the pinion 149 laterally into its declutch position disengaging the gears 147 and 148. The stub shaft 150 is moved laterally against the bias of the coil spring 151 into a clutch position, so as to move the pinion 149 laterally into its clutch position engaging the gears 147 and 148, by a cooperating lever 152; which lever 152 is pivotally mounted at the intermediate portion thereof, as indicated at 153, upon a stationary support 154; and which lever 152 is pivotally connected at one end thereof, as indicated at 155, to the stub shaft 150. The other end of the lever 152 carries a follower 156 that rides a cooperating cam 157 rigidly secured to the operating shaft 131.

The timer motor 140 further comprises magnetic yoke structure including an arm 158 carrying a winding 159. The opposite ends of the arm 158 respectively connect to two legs 160 and 161 that respectively carry the two pole pieces 142 that are operatively associated with the rotor 141. The leg 160 projects beyond the adjacent pole piece 142 and carries at the outer end thereof a buzzer 162 that includes a metal spring 163 formed of magnetic material, one end of the spring 163 being rigidly secured to the adjacent end of the leg 160, and the free end of the spring 163 carrying an armature 164 disposed in cooperating spaced-apart relation with the adjacent end of the leg 161. Also the buzzer 162 includes a wedge 165 formed of magnetic material and arranged in cooperating relation between the armature 164 and the adjacent end of the leg 161; which wedge 165 is carried upon the outer end of a rod 166 mounted for longitudinal movements substantially parallel to the operating shaft 143. The inner end of the rod 166 is pivotally connected, as indicated at 167, to one arm of a bell crank 168 that is pivotally supported, as indicated at 169, upon an external support 170. Another arm of the bell crank 168 is pivotally connected, as indicated at 171, to one end of a rod 172; and the other end of the rod 172 is pivotally connected, as indicated at 173, to the intermediate portion of a lever 174. Another intermediate portion of the lever 174 is pivotally connected, as indicated at 175, to an external support 176. One end of the lever 174 is biased into a given position by a cooperating coil spring 177; and the other end of the lever 174 carries a follower 178 that rides a cooperating cam 179 rigidly secured to the operating shaft 131.

Also, the operating shaft 131 carries an insulating cam 180 rigidly affixed thereto; which cam 180 cooperates with an external stop 181. Moreover, the cam 180 cooperates with a follower switch spring 182 riding the same; which switch spring 182 cooperates with two other switch springs 183 and 184. In the arrangement the switch springs 184, 183 and 182 respectively terminate a conductor 185, a conductor 186, and the conductor 126.

When the dial 132 occupies its "off" position: one shoulder 180a of the cam 180 engages the limit stop 181; the cam 180 actuates the switch spring 182 to disengage the switch spring 183 and to engage the switch spring 184; the cam 179 actuates the follower 178, so as to rotate the lever 174 in the counter-clockwise direction about the pivot 175, as shown in FIG. 1, so that the rod 172 actuates the bell crank 168 in order to actuate the rod 166 for the purpose of projecting the wedge 165 into a keeping position and between the armature 164 and the adjacent end of the leg 161; and the cam 157 actuates the follower 156, so as to release the lever 152 in order to allow the coil spring 151 to rotate the lever 152 in the clockwise direction about the pivot 153, as shown in FIG. 1, so that the stub shaft 150 moves laterally to move the pinion 149 into its declutch position disengaging the two gears 147 and 148 for the purpose of declutching the shaft 145 from the operating shaft 131.

When the dial 132 occupies its "0" position; the one shoulder 180a of the cam 180 disengages the limit stop 181; the cam 180 actuates the switch spring 182 to disengage the switch spring 183 and to engage the switch spring 184; the cam 179 actuates the follower 178, so as to release the lever 174 in order to allow the coil spring 177 to rotate the lever 174 in the clockwise direction about the pivot 175, as shown in FIG. 1, so that the rod 172 actuates the bell crank 168 in order to actuate the rod 166 for the purpose of withdrawing the wedge 165 into a releasing position and from between the armature 164 and the adjacent end of the leg 161; and the cam 157 actuates the follower 156, so as to release the lever 152 in order to allow the coil spring 151 to rotate the lever 152 in the clockwise direction about the pivot 153, as shown in FIG. 1, so that the stub shaft 150 moves laterally to move the pinion 149 into its declutch position disengaging the two gears 147 and 148 for the purpose of declutching the shaft 145 from the operating shaft 131.

When the dial 132 occupies any of its numerical positions "1," "5," "10," etc.: the one shoulder 180a of the cam 180 disengages the limit stop 181; the cam 180 actuates the switch spring 182 to engage the switch spring 183 and to disengage the switch spring 184; the cam 179 actuates the follower 178, so as to rotate the lever 174 in the counter-clockwise direction about the pivot 175, as shown in FIG. 1, so that the rod 172 actuates the bell crank 168 in order to actuate the rod 166 for the purpose of projecting the wedge 165 into its keeping position and between the armature 164 and the adjacent end of the leg 161; and the cam 157 actuates the follower 156, so as to rotate the lever 152 in the counter-clockwise direction about the pivot 153, as shown in FIG. 1, so that the stub shaft 150 moves laterally to move the pinion 149 into its clutch position engaging the two gears 147 and 148 for the purpose of clutching the shaft 145 to the operating shaft 131.

The winding 159 of the timer motor 140 is connected across the neutral line N and a conductor 190; and a pilot lamp 191 of the neon type is bridged across the winding 159 and between the neutral conductor N and the conductor 190. When the conductor 190 is connected to the line L2, via a circuit traced hereinafter, the winding 159 is energized in an obvious manner, and the pilot lamp 191 glows to indicate the energization of the winding 159. Energization of the winding 159 causes rotation of the rotor 141 in a known manner; and it may be assumed that the same is rotated at a synchronous speed of 3600 r.p.m. Also, it may be assumed that the gear box 144 causes rotation of the shaft 145 at a speed of 1 revolution per 40 minutes, as indicated by the constructional example of the dial 132, so that the dial 132 is rotated ½ revolution per 20 minutes in accordance with the legends "0" and "20" carried thereby. Specifically, rotation of the shaft 143 at 3600 r.p.m. causes the gear box 144 to drive the shaft 143 at a speed of 1 revolution per 40 minutes; which rotation of the shaft 145 is transmitted to the operating shaft 131 only when the clutch 146 occupies its clutch position causing rotation of the operating shaft 131 in the counter-clockwise direction, as viewed in FIG. 1, and at the speed of 1 revolution per 40 minutes; and which rotation of the shaft 145 is not transmitted to the operating shaft 131 when the clutch 146 occupies its declutch position. Also, energization of the winding 159 causes magnetic "leakage" of flux via the path between the legs 160 and 161 and including the spring 163, the armature 164 and the wedge 165. When the wedge 165 occupies its projected position between the armature 164 and the adjacent end of the leg 161, the armature 164 is restrained against chatter, so that no substantial audible noise is produced and the buzzer 162 may be considered to be "turned off." On the other hand, when the wedge 165 occupies its withdrawn position from between the armature 164 and the adjacent end of the leg 161, the armature 164 is released to chatter, so that the same vibrates into alternate engagement and disengagement with the wedge 165, in order to produce an audible noise and the buzzer 162 may be considered to be "turned on."

In the timer 130, rotation of the dial 132 into its "25" minute position causes the other shoulder 180b to engage the limit stop 181, so as to prevent clockwise rotation thereof beyond its "25" minute position mentioned. In passing, it is noted that any suitable angle less than 360° of rotation may be provided between the two shoulders 180a and 180b; and this angle may correspond to any desired maximum settable time interval depending upon the gear box 144. Thus, the "25" minute position of maximum settable time interval is of no significance and is only illustrated by way of an example.

Recapitulating with reference to the operation of the timer 130; the same is manually rotated by the cook out of its "off" position in the clockwise direction, and through its "0" position, into some desired numerical position, such, for example, as its "20" minute position, so as to preset a corresponding cooking time interval of 20 minutes. As explained more fully hereinafter, this setting of the dial 132 into its "20" minute position causes "warm-up" of the electronic auxiliaries; subsequently, and upon initiation of opertion of the preset cooking cycle in the oven cavity 202, operation of the timer motor 140 is initiated, with the result that the shaft 145 is rotated to effect rotation of the operating shaft 131 through the clutch 146 in its clutch position and in the counter-clockwise direction at the speed of 1 revolution per 40 minutes (½ revolution per 20 minutes). Thus, at the expiration of 20 minutes of cooking time interval, the dial 132 is rotated into its "0" position; whereby the cam 180 operates the switch springs 182, 184 to bring about termination of the cooking cycle in the oven cavity 202. Also, the cam 157 causes operation of the clutch 146 into its declutch position, so that further operation of the timer motor 140 does not disturb the "0" position of the dial 132. Further, the cam 179 causes operation of the wedge 165, so that the buzzer 162 is operated from its "turn-off" position into its "turn-on" position to produce an audible noise indicating to the cook the termination of the preset cooking time interval.

The cook receiving the audible signal noted, then manually rotates the dial 132 in the counter-clockwise direction from its "0" position back into its "off" position; whereby the cam 179 causes operation of the wedge 165, so that the buzzer 162 is operated from its "turn-on" position back into its "turn-off" position to arrest the audible noise produced thereby.

Further considering the circuit network, the magnetron 210 is supplied with D.C. power from an associated voltage doubler and rectifier circuit or unit 230 that comprises a pair of input terminals 231, 232 and a pair of output terminals 233, 234, as well as a pair of condensers C1 and C2, that are preferably of the electrolytic type, and a pair of diodes R1 and R2, that are preferably of the silicon-crystal type. Also, the circuit 230 comprises a bleeder or stabilizing resistor 235 connected across the output terminals 233, 234, and a surge limiting resistor 236 and a current protective device in the form of a thermal fuse 237. One terminal of the condenser C1 is connected by a conductor 238 to the output terminal 233; the other terminal of the condenser C1 is connected by a conductor 239 to one terminal of the condenser C2; and the other terminal of the condenser C2 is connected by a conductor 240 to the output terminal 234. The input terminal 231 is connected by a conductor 241 to the positive pole of the diode or rectifier R1 and to the negative pole of the diode or rectifier R2; the negative pole of the rectifier R1 is connected to the conductor 238; and the positive pole of the rectifier R2 is connected to the conductor 240. The input terminal 232 is connected by a conductor 242 to one terminal of the fuse 237; the other terminal of the fuse 237 is connected by a conductor 243 to one terminal of the resistor 236; and the other terminal of the resistor 236 is connected to the conductor 239. The output terminal 233 is connected to a B+ conductor; and the output terminal 234 is connected to a B— conductor.

Thus the voltage doubler aond rectifier unit 230 consists essentially of an assembly of rectifiers R1 and R2 and capacitors C1 and C2; whereby the unit 230 is entirely devoid of a transformer or other inductive coupling element; with the result that there is a first galvanic connection from the input terminal 231 via the rectifier R1 to the output terminal 233 and there is a second galvanic connection from the input terminal 231 via the rectifier R2 to the output terminal 234.

Also the circuit network comprises a start resistor 245 and a start inductor 246. One terminal of the start resistor 245 is connected to a conductor 247; the other terminal of the start resistor 245 is connected by a conductor 248 to the input terminal 232 of the circuit 230; and the input terminal 231 of the circuit 230 is connected to the conductor 125 extending to the switch springs 115 and 124 of the power selector switch 110. One terminal of the start inductor 246 is connected to the B+ conductor; the other terminal of the start inductor 246 is connected to the conductor 223 extending to the field winding section 220b of the magnetron 210; and the B— conductor extending from the output terminal 234 of the circuit 230 is connected to the cathode terminal 218 of the magnetron 210.

Further, the circuit network comprises a transformer 250 provided with a primary winding 251 and a secondary winding 252, as well as a coupling magnetic core 253. One extremity of the primary winding 251 is connected to the conductor 127 extending to the switch spring 119 of the power switch 110; the other extremity of the primary winding 251 is connected to the neutral line N; an intermediate tap on the primary winding 151 is connected by a conductor 254 to one terminal of a resistor 255; and the other terminal of the resistor 255 is connected to a conductor 256. The terminals of the secondary winding 252 are respectively connected to the B— conductor and to a conductor 257; and the conductor 257 is connected to the heater terminal 219 of the magnetron 210.

Further, the circuit network comprises a major time delay relay 260 of the thermal type, a minor time delay relay 270 of the dash-pot type, a power relay 280 and a control relay 290. The major time delay relay 260 comprises a bimetallic member 261 provided with a heater 262 and a cooperating switch spring 263. The minor time delay relay 270 comprises a dash-pot 271 and three springs 272, 273 and 274, the dash-pot 271 being operatively connected to the spring 273, as illustrated. The spring 272 constitutes a switch spring cooperating with a switch spring 275; and the spring 274 constitutes a switch spring cooperating with a switch spring 276. The power relay 280 comprises a switch spring 281 that cooperates with two other switch springs 282 and 283, a switch spring 284 that cooperates with a switch spring 285, and a switch spring 286 that cooperates with two other switch springs 287 and 288. The control relay 290 comprises a switch spring 291 that cooperates with two other switch springs 292 and 293.

In the circuit network, one terminal of the heater 262 is connected to the neutral line N; the other terminal of the heater is connected to a conductor 264 that is terminated by the switch spring 282; the conductor 186 extending from the switch spring 183 of the timer 130 is connected to one end of the bimetallic member 261 and terminated by the switch spring 281; a resistor 265 is bridged across the conductors 186 and 264; the switch springs 263 and 283 commonly terminate a conductor 266; the conductor 266 is commonly connected to one terminal of the winding of the power relay 280 and to one terminal of the winding of the control relay 290; and the conductor 266 is terminated by the switch spring 293. The other terminal of the winding of the power relay 280 and the other terminal of the winding of the control relay 290 are commonly connected to the neutral line N. The switch springs 284 and 286 commonly terminate the conductor 186; the switch springs 285, 287 and 288 respectively terminate the conductors 247, 128 and 256; and the switch springs 291 and 292 respectively terminate the conductors 190 and 185.

The winding of the minor time delay relay 270 is connected across the conductor 247 and the neutral line N; the switch springs 272 and 275 respectively terminate the conductor 228 and the B+ conductor; and the switch springs 274 and 276 respectively terminate the conductors 248 and 247.

Considering the general mode of operation of the voltage doubler and rectifier circuit 230 in conjunction with the power selector switch 110, it is noted that when the power selector switch 110 occupies its "Hi" position, the line conductor L1 is connected via the closed switch springs 116, 115 to the conductor 125 and thus to the input terminal 231 of the circuit 230, and the line conductor L2 may be assumed to be conneteced via the closed switch springs 106, 107, the conductor 108 and the closed switch springs 118, 117 to the conductor 126. On the other hand, when the power selector switch 110 occupies its "Lo" position, the neutral conductor N is connected via the closed switch springs 123, 124 to the conductor 125 and thus to the input terminal 231 of the circuit 230, and the line conductor L2 may be assumed to be connected via the closed switch springs 106, 107, the conductor 108 and the closed switch springs 121, 122 to the conductor 126. The conductor 126 may be connected via the closed switch springs 182, 183 of the timer 130 to the conductor 186; the conductor 186 may be connected via the closed switch springs 284, 285 of the operated power relay 280 to the conductor 247; the conductor 247 may be connected via the closed switch springs 276, 274 of the operated minor time delay relay 270 to the conductor 248; and the conductor 248 is connected to the input terminal 232 of the circuit 230. Thus, when the power selector switch 110 occupies its "Hi" position, 236 volts, A.C., may be impressed between the input terminals 231 and 232; and when the power selector switch 110 occupies its "Lo" position, 118 volts, A.C., may be impressed between the input terminals 231 and 232.

When the high A.C. voltage (236 volts) is applied across the input terminals 231 and 232, a high D.C. voltage (about 570 bolts) is presented across the output terminals 233 and 234; and when the low A.C. voltage (118 volts) is applied across the input terminals 231 and 233, a low D.C. voltage (about 290 volts) is produced across the output terminals 233 and 234. In this connection it is noted that in the positive loops of the input A.C. voltage the diode R1 is conducting and the diode R2 is blocking, so that the condenser C1 is charged; on the other hand, in the negative loops of the input A.C. voltage the diode R2 is conducting and the diode R1 is blocking, so that the condenser C2 is charged. Specifically, each of the condenser C1 and C2 is charged to a D.C. voltage that is only somewhat lower than the peak voltage of the input voltage A.C.; and since the two condensers C1 and C2 are bridged in series relation across the output terminals 233, 234, the output voltage D.C. at the output terminals 233, 234 is only somewhat lower than double the peak voltage A.C. at the input terminals 231, 232. The output voltage D.C. mentioned is also only somewhat higher than double the R.M.S. voltage of the input voltage A.C. mentioned, and in passing it is noted that an A.C. supply source of a R.M.S. voltage of 236 volts has a peak voltage of approximately 333 volts.

Of course, the D.C. output voltage of the output terminals 233, 234 may be applied via the B+ conductor, the closed switch springs 275, 272 and the conductor 233 to one terminal of the field winding section 220b of the magnetron 210, and via the B— conductor to the cathode terminal 218 and to the cathode 213 of the magnetron 210; whereby the magnetron 210 oscillates in a known manner to produce a R.F. voltage that is applied to the terminals 215 and 216 and then coupled via the condensers 221, 222 to the elements 206, 207 of the transmission line 205; whereby the antenna 206x radiates the R.F. energy in the cooking cavity 202 for the cooking purpose. The ultra-high frequency of 915 mc. of the magnetron 210 is inherent in the construction thereof; however, the R.F. voltage, and consequently the R.F. power, is obviously dependent upon the applied plate voltage. Of course, the voltage D.C. of the voltage doubler and rectifier circuit 230 at the output terminals 233, 234 provides the plate voltage of the magnetron 210; and the output voltage of the circuit 230 at the output terminals 233, 234 is governed by the position of the power selector switch 110 in its "Hi" and "Lo" positions; which position of the power selector switch 110 may be selectively manually preset by the cook, as explained more fully below.

Now considering the overall operation of the circuit network, it may be assumed that a cooking operation is to be carried out in the oven cavity 202 during any suitable time interval, such for example, as 15 minutes, and that high power is required in the cooking operation. The cook places the food in the oven cavity 202 and latches close the door 203, whereby the door latch mechanism 102 operates the door latch switch 105 to close the switch springs 106, 107. The cook may then rotate the dial 132 of the timer 130 out of its "off" position into its "15" minute position, in the clockwise direction, as viewed in FIG. 1, whereby the timer 130 is conditioned for operation in the manner previously described. Now the cook may rotate the dial 112 of the power selector switch 110 into its "Hi" position; whereby the line conductor L1 is connected via the closed switch springs 116, 115 to the conductor 125 and thus to the input terminal 231 of the voltage doubler and rectifier circuit 230. Also, the line conductor L2 is connected via the closed switch springs 106, 107 and the conductor 108 and the closed switch springs 118, 117 to the conductor 126, and via the closed switch springs 182, 183 to the conductor 186. The potential on the conductor 186 is connected via the closed switch springs 286, 288 and the conductor 256 and the resistor 255 to the conductor 254, whereby the lower section of the primary winding 251 is energized to produce energization of the secondary winding 252 with a relatively high A.C. voltage, so as to effect heating of the cathode heater 214 of the magnetron 210 via an obvious circuit. The heater 214 effects heating of the cathode 213, whereby the same is rendered electron emissive.

Also, the application of potential to the conductor 186 completes a circuit via the closed switch springs 281, 282 and the conductor 264 for energizing the heater 262 of the major time delay relay 260, so that the same is heated effecting heating of the bimetallic member 261, causing the same to deflect toward the switch spring 263. After a suitable time interval, say 45 seconds, the bimetallic member 261 engages the switch spring 263 applying the potential to the conductor 266, so that the windings of the two relays 280 and 290 are energized in parallel relation causing these relays to operate. Upon operating, the power relay 280 opens the switch springs 281, 282 in order to insert the resistor 265 into series relation with the heater 262 and into a holding circuit for energizing the heater 262, so as to supply heat at a somewhat lower rate to the bimetallic member 261 for the purpose of retaining the same in its deflected position engaging the switch spring 263. Also, the switch springs 281, 283 are closed, so as directly to connect the conductor 186 to the conductor 266 in order to complete holding circuits for energizing the windings of the relays 280 and 290 independently of the position of the bimetallic member 261. Further, the switch springs 286, 288 are opened, so as to interrupt the previously traced circuit for energizing the lower section of the primary winding 251 of the transformer 250. Further, the switch springs 286, 287 are closed, so as to prepare a point in a circuit for energizing the full primary winding 251 of the transformer 250; which circuit mentioned is not completed in the present case by virtue of the open switch springs 119, 120 of the power selector 110 in its "Hi" position. Thus, in this case, the primary winding 251 is deenergized to effect corresponding deenergization of the secondary winding 252, so as to terminate heating of the cathode heater 214. This is desirable in the present case, since the magnetron 210 is to be operated at high power, with the result that the plate current sustains the hot cathode 213 in an electron emissive condition, as explained below.

Finally, upon operating, the power relay 280 closes the switch springs 284, 285 in order to connect the conductor 186 to the conductor 247 and thus via the start resistor 245 and the conductor 248 to the input terminal 232 of the voltage doubler and rectifier 230. Hence, at this time the line conductors L1 and L2 are respectively connected to the input terminals 231 and 232 of the circuit 230, so that high voltage D.C., is produced at the output terminals 233 and 234 of the circuit 230. The output terminal 233 is connected via the B+ conductor, the start inductor 246, the conductor 223, the field winding section 220b, the conductor 221, the field winding section 220a, the conductor 222 and the terminal 217 to the anode 212; and the output terminal 234 is connected via the B— conductor and the terminal 218 to the cathode 213; whereby the magnetron 210 oscillates in a known manner. In this initial or starting operation of the magnetron 210, the inclusion of the start resistor 245 in the input circuit of the voltage doubler and rectifier circuit 230 lends a characteristic of high impedance to the circuit 230 that is advantageous in effecting starting of oscillation of the magnetron 210. Also, in this initial or starting operation of the magnetron 210, the inclusion of the start inductor 246 in the output circuit of the voltage doubler and rectifier circuit 230 lends a characteristic of high inductive reactance to the magnetron 210, so as to prevent the field winding sections 220a and 220b from producing such a large composite voltage drop that there is inadequate voltage applied between the anode 212 and the cathode 213 of the magnetron 210. Specifically, the start inductor 246 prevents a current surge in the output circuit that would cause the large voltage drop mentioned across the field winding sections 220b and 220a connected in series relation with the anode 212 and the cathode 213 of the magnetron 210. Accordingly, both the start resistor 245 and the start inductor 246 are useful to effect starting of oscillation of the magnetron 210, but are employed only for a very short or minor time interval of perhaps 5 seconds for the starting purpose described.

Also, the application of potential to the conductor 247, not only initiates operation of the voltage doubler and rectifier circuit 230, as described above, but effects energization of the winding of the minor time delay relay 270; whereby the dash-pot 271 retards operation of the switch springs 272, 275 and 274, 276 for the short or minor time interval of say 5 seconds, as previously noted. Upon operation, the minor time delay relay 270 closes the switch springs 272, 275 and 274, 276. The closure of the switch springs 272, 275 shorts-out the start inductor 246; and the closure of the switch springs 274, 276 shorts-out the start resistor 245. The removal of the start resistor 245 from the input circuit of the voltage doubler and rectifier circuit 230 causes the same to develop its full power; and the removal of the start inductor 246 from the plate and field winding circuit of the magnetron 210 causes the same to develop its full R.F. power and to supply the same to the cooking cavity 202 for the present cooking purpose.

Reverting to the operation of the control relay 290, the same opens the switch springs 291, 292 and closes the switch springs 291, 293. Closure of the switch springs 291, 293 connects the conductor 266 to the conductor 190, so as to energize the winding 159 of the timer motor 140 of the timer 130 and to illuminate the glow lamp 191 to indicate this circumstance. Thus, the timer motor 140 rotates its rotor 141, without operating the buzzer 162, so that the engaged clutch 146 brings about the restoration of the operating shaft 131 into its "0" position upon the expiration of 15 minutes following operation of the control relay 290; which operation of the control relay 290 was simultaneous with the operation of the power relay 280 and the consequent initiation of operation of the voltage doubler and rectifier circuit 230. Of course, operation of the magnetron 210 at its full power was delayed perhaps 5 seconds following operation of the power relay 280, by virtue of the timing operation of the minor time delay relay 270, but this is of no consequence in a preset cooking time interval of 15 minutes, as previously assumed.

When the dial 132 of the timer 130 is thus returned into its "0" position by operation of the timer motor 140, as described above, the cam 157 governs the follower 156 to actuate the clutch 146 into its declutch position, as previously described, so that subsequent operation of the timer motor 140 does not disturb the operating shaft 131 in its "0" position. Also, the cam 179 governs the follower 178 so as to withdraw the wedge 165 from between the armature 164 and the adjacent end of the leg 161, so as to cut-on the buzzer 162, with the result that the chatter of the armature 164 produces an audible noise indicating to the cook the expiration of the preset time interval.

Further, the cam 180 in the "0" position of the operating shaft 131 opens the switch springs 182, 183 and closes the switch springs 182, 184. Opening of the switch springs 182, 183 removes potential from the conductor 186, with the result all of the relays 260, 270, 280 and 290 restore, and operation of the voltage doubler and rectifier circuit 230 is arrested, so that oscillation of the magnetron 210 is arrested to terminate the supply of R.F. power to the oven cavity 202 and to end the cooking operation in the oven cavity 202.

Closing of the switch springs 182, 184 completes an alternative circuit for energizing the winding 159 of the timer motor 140; this alternative circuit including the elements: L2, 106, 107, 108, 118, 117, 126, 182, 184, 185, 292, 291, 190 and N; whereby operation of the buzzer 162 is continued, notwithstanding the restoration of all of the relays 290, etc.

When the cook subsequently manually returns the dial 132 from its "0" position into its "off" position, the cam 179 governs the follower 178, so as to effect insertion of the wedge 165 between the armature 164 and the adjacent end of the leg 161, thereby to "cut-off" the buzzer 162, although the winding 159 of the timer motor 140 is still energized.

In order completely to deenergize the winding 159, the cook may restore the power selector switch 110 into its "off" position, so as to open the switch springs 117, 118 in order to disconnect potential from the conductor 126; whereby the winding 159 is deenergized, and the pilot lamp 191 is extinguished to indicate this circumstance.

The operation of the circuit network to supply low power to the magnetron 210 is fundamentally the same as the operation thereof to supply high power to the magnetron 210, and proceeds as a consequence of the setting of the power selector switch 110 into its "Lo" position. In this case, the operations proceed as previously described until the power relay 280 operates; whereby the circuit for energizing the full primary winding 251 of the transformer 250 is completed at the close switch springs 286, 287. This circuit includes the elements: L2, 106, 107, 108, 121, 122, 126, 182, 183, 186, 286, 287, 128, 120, 119, 127 and N. The energization of the full primary winding 251 effects a reduction of the voltage induced in the secondary winding 252 so as to reduce the heating of the heater 214, as the plate current of the magnetron 210 at low power will produce the remainder of the desired heating of the cathode 213 of the magnetron 210.

Also, in this case, the power selector switch 110 in its "Lo" position connects the neutral conductor N to the input terminal 231, so that upon operation the power relay 280 connects the line conductor L2 to the input terminal 232. Accordingly, the voltage doubler and rectifier circuit 230 operates to produce low D.C. power, so as to cause the magnetron 210 to supply low R.F. power to the oven cavity 202 for the cooking purpose.

During the operation of the circuit network, and without reference to the position of the power selector switch 110, should the cook unlatch the front door 203 to obtain access to the oven cavity 202, the latching mechanism 102 actuates the door latch switch 105 into its open position, so that the line conductor L2 is disconnected from the conductor 108 in order to arrest operation of the voltage doubler and rectifier circuit 230 and to cause the restoration of all of the relays 260, 270, 280 and 290. Moreover, the disconnection of potential from the conductor 108 effects deenergization of the winding 159 of the timer motor 140 and arrests operation of the buzzer 162 in the event it is operating at the time when the latching mechanism 102 is thus operated to release the front door 203 for movement out of its closed position.

In the circuit network, the starting characteristic of the magnetron 210 from the voltage doubler and rectifier circuit 230 is greatly improved by the momentary inclusions of the start resistor 245 in the input of the circuit 230 and of the start inductor 246 in the output of the circuit 230, since each of these elements (245 or 246) increases the initial effective impendance of the output of this circuit 230 as viewed by the magnetron 210. Thus, the elements 245 and 246 are functionally equivalent; whereby either one of these elements may be omitted from the circuit network, if the other of these elements is correspondingly adjusted to compensate for the omission of the one element. Thus, three satisfactory species of the circuit network will be immediately apparent; and others will be obvious, since it is to be understood that the elements 245 and 246 function to increase the impendance of the output of the circuit 230 momentarily and during starting of the magnetron 210, and then the minor time delay relay 270 operates to reduce the impendance of the output of the circuit 230 to a predetermined value corresponding to that insuring efficient operation of the magnetron 210.

In view of the foregoing, it is apparent that there has been provided a control circuit network for operating a magnetron incorporated in an electronic cooking oven, wherein the control circuit network imparts desired starting and running conditions for the magnetron in an improved and simplified manner, and wherein the control circuit effects timing of the electronic cooking operation as preset by the cook and then transmits to the cook an audible signal indicating the completion of the electronic cooking operation.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. An ultra-high frequency control and power supply system comprising a magnetron including a pair of input terminals and a pair of output terminals, said magnetron being characterized by the production of an A.C. voltage of ultra-high frequency across the output terminals thereof in response to the application of a D.C. voltage across the intput terminals thereof, a voltage doubler and rectifier unit including a pair of input terminals and a pair of output terminals, said unit consisting essentially of an assembly of rectifiers and capacitors and being characterized by the production of a relatively high D.C. voltage across the output terminals thereof in response to the application of a relatively low A.C. voltage across the input terminals thereof, first connections between the input terminals of said magnetron and the output terminals of said unit, a block including terminals adapted to be connected to a source of power supply of relatively low voltage A.C., second connections between the terminals of said block and the input terminals of said unit, a control device having a start position imparting relatively high impedance to the output of said unit and having a run position imparting relatively low impedance to the output of said unit, and control means for selectively operating said control device between its start position and its run position.

2. The ultra-high frequency control and power supply system set forth in claim 1, wherein said control means essentially comprises timer apparatus that is actuated a given time interval after an A.C. voltage is applied to the input terminals of said unit to operate said control device from its start position into its run position.

3. An ultra-high frequency control and power supply system comprising a magnetron including a pair of input terminals and a pair of output terminals, said magnetron being characterized by the production of an A.C. voltage of ultra-high frequency across the output terminals thereof in response to the application of a D.C. voltage across the input terminals thereof, a voltage doubler and rectifier unit including a pair of input terminals and a pair of output terminals, said unit consisting essentially of an assembly of rectifiers and capacitors and being characterized by the prdouction of a relatively high D.C. voltage across the output terminals thereof in response to the application of a relatively low A.C. voltage across the input terminals thereof, first connections between the input terminals of said magnetron and the output terminals of said unit, a block including terminals adapted to be connected to a source of power supply of relatively low voltage A.C., second connections between the terminals of said block and the input terminals of said unit, an impedance element, a control device having a start position inserting said impedance element into said first connections and having a run position removing said impedance element from said first connections, and control means for selectively operating said control device between its start position and its run position.

4. The ultra-high frequency control and power supply system set forth in claim 3, wherein said impedance element essentially comprises an inductor.

5. An ultra-high frequency control and power supply system comprising a magnetron including a pair of input terminals and a pair of output terminals, said magnetron being characterized by the production of an A.C. voltage of ulta-high frequency across the output terminals thereof in response to the application of a D.C. voltage across the input terminals thereof, a voltage doubler and rectifier unit including a pair of input terminals and a pair of output terminals, said unit consisting essentially of an assembly of rectifiers and capacitors and being characterized by the production of a relatively high D.C. voltage across the output terminals thereof in response to the application of a relatively low A.C. voltage across the input terminals thereof, first connections between the input terminals of said magnetron and the output terminals of said unit, a block including terminals adapted to be connected to a source of power supply of relatively low voltage A.C., second connections between the terminals of said block and the input terminals of said unit, an impedance element, a control device having a start position inserting said impedance element into said second connections and having a run position removing said impedance element from said second connections, and control means for selectively operating said control device between its start position and its run position.

6. The ultra-high frequency control and power supply system set forth in claim 5, wherein said impedance element essentially comprises a resistor.

7. An ultra-high frequency control and power supply system comprising a magnetron, said magnetron including an anode and a cathode and a cathode heater and a field winding arranged to produce a cross-field in the anode-cathode space and a pair of input terminals connecting said field winding in series relation with said anode and said cathode and a pair of output terminals operatively coupled to said anode and to said cathode, said magnetron being characterized by the production of an A.C. voltage of ultra-high frequency across the output terminals thereof in response to the application of a D.C. voltage across the input terminals thereof, a voltage doubler and a rectifier unit including a pair of input terminals and a pair of output terminals, said unit being characterized by the production of a relatively high D.C. voltage across the output terminals thereof in response to the application of a relatively low A.C. voltage across the input terminals thereof, first connections between the input terminals of said magnetron and the output terminals of said unit, a block including terminals adapted to be connected to a source of power supply of relatively low voltage A.C., a first control device having a go position completing second connections between the terminals of said block and the input terminals of said unit and a stop position interrupting said second connections, a second control device having a start position imparting relatively high impedance to the output of said unit and a run position imparting relatively low impedance to the output of said unit, first control means for initiating the supply of power to said cathode heater and then a first given time interval thereafter for operating said first control device from its stop position into its go position and then a second given time interval thereafter for operating said second control device from its start position into its run position, and second control means for arresting the supply of power to said cathode heater and for operating said first control device from its go position back into its stop position and for operating said second control device from its run position back into its start position.

8. An ultra-high frequency control and power supply system comprising a magnetron, said magnetron including an anode and a cathode and a cathode heater and a field winding arranged to produce a cross-field in the anode-cathode space and a pair of input terminals connecting said field winding in series relation with said anode and said cathode and a pair of output terminals operatively coupled to said anode and to said cathode, said magnetron being characterized by the production of an A.C. voltage of ultra-high frequency across the output terminals thereof in response to the application of a D.C. voltage across the input terminals thereof, a voltage doubler and rectifier unit including a pair of input terminals and a pair of output terminals, said unit being characterized by the production of a relatively high D.C. voltage across the output terminals thereof in response to the application of a relatively low A.C. voltage across the input terminals thereof, first connections between the input terminals of said magnetron and the output terminals of said unit, a block including terminals adapted to be connected to a source of power supply of relatively low voltage A.C., a first control device having a go position completing second connections between the terminals of said block and the input terminals of said unit and a stop position interrupting said second connections, a second control device having a start position imparting relatively high impedance to the output of said unit and a run position imparting relatively low impedance to the output of said unit, a manually settable control member having a home position and a variable time set position, clock-controlled means for returning said control member on a timed basis from its variable time set position back into its home position, first control means governed by said member in its time set position for initiating the supply of power to said cathode heater and then a first given time interval thereafter for operating said first control device from its stop position into its go position and then a second given time interval thereafter for operating said second control device from its start position into its run position, and second control means governed by said control member in its home position for arresting the supply of power to said cathode heater and for operating said first control device from its go position back into its stop position and for operating said second control device from its run position back into its start position.

9. In combination, an electronic oven including a cooking cavity, a magnetron having input terminals and output terminals, first connections from the output terminals of said magnetron to the cooking cavity of said electronic oven, a power supply unit including input terminals and output terminals, second connections from the output terminals of said power supply unit to the input terminals of said magnetron, a source of electric power, a switch having closed and open positions respectively connecting and disconnecting the input terminals of said power supply unit with respect to said electric power source, a manually settable control member having an off position and a home position and a variable set position, the variable set position of said control member corresponding to a desired variable time interval of a cooking operation to be carried out in the cooking cavity of said electronic oven, a timer motor adapted to return said control member from its variable set position back into its home position at a given timed rate, a clutch having clutched and declutched positions respectively connecting and disconnecting said control member with respect to said timer motor, timing apparatus, means responsive to setting of said control member out of its home position and into its variable set position for operating said clutch from its declutched position into its clutched position and for initiating operation of said timing apparatus, means responsive to initiation of operation of said timing apparatus for initiating the warm-up of said magnetron for subsequent operation, means responsive to a given timing operation of said timing apparatus for closing said switch in order to initiate operation of said magnetron and for initiating operation of said timer motor, operation of said timer motor with said clutch in its clutched position effecting the return of said control member from its variable set position back into its home position in accordance with the preset time interval, means responsive to the return of said control member back into its home position for opening said switch in order to terminate operation of said magnetron and for operating said clutch from its clutched position back into its declutched position, a signal device, means responsive to operation of said timer motor with said control member in its home positin for operating said signal device, and means responsive to subsequent manual operation of said control member from its home position into its off position for arresting operation of said signal device.

10. The electronic oven combination set forth in claim 9, wherein said signal device is of the audible type and is operated fundamentally from leakage flux from said operating timer motor.

11. In combination, an electronic oven including a cooking cavity, a magnetron having input terminals and output terminals, first connections from the output terminals of said magnetron to the cooking cavity of said electronic oven, a power supply unit including input terminals and output terminals, second connections from the output terminals of said power supply unit to the input terminals of said magnetron, a source of electric power, a switch having closed and open positions respectively connecting and disconnecting the input terminals of said power supply unit with respect to said electric power source, a manually settable control member having an off position and a home position and a variable set position, the variable set position of said control member corresponding to a desired variable time interval of a cooking operation to be carried out in the cooking cavity of said electronic oven, a timer motor adapted to return said control member from its variable set position back into its home position at a given timed rate, a clutch having clutched and declutched positions respectively connecting and disconnecting said control member with respect to said timer motor, a signal device operatively associated with said timer motor and including an armature that is adapted to be operated by operation of said timer motor, signal control mechanism having a restraint position restraining the armature of said signal device against operation and a release position releasing the armature of said signal device for operation, means governed by said control member in its home position for actuating said signal control mechanism into its release position and governed by said control member in either its off position or its variable set position for actuating said signal control mechanism into its restraint position, timing apparatus, means responsive to setting of said control member out of its home position and into its variable set position for operating said clutch from its declutched position into its clutched position and for initating operation of said timing apparatus, means responsive to initiation of operation of said timing apparatus for initiating the warm-up of said magnetron for subsequent operation, means responsive to a given timing operation of said timing apparatus for operating said switch into its closed postion in order to initiate operation of said magnetron and for initiating operation of said timer motor, operaton of said timer motor with said clutch in its clutched position effecting the return of said control member from its variable set position back into its home position in accordance with the preset time interval, and means responsive to the return of said control member back into its home position for operating said switch into its open position in order to terminate operation of said magnetron, whereby operation of said timer motor prior to manual operation of said control member from its home position back into its off position effects operation of said signal device.

12. The electronic oven combination set forth in claim 11, and further comprising a manually operable power selector having off and on positions, said power selector in its off position positively preventing operation of both said magnetron and said timer motor and in its on position preparing for operation both said magnetron and said timer motor.

13. An ultra-high frequency control and power supply system comprising a magnetron including a pair of input terminals and a pair of output terminals, said magnetron being characterized by the production of an A.C. voltage of ultra-high frequency across the output terminals thereof in response to the application of a D.C. voltage across the input terminals thereof, a voltage doubler and rectifier unit including a pair of input terminals and a pair of output terminals, said unit consisting essentially of an assembly of rectifiers and capacitors and being characterized by the production of a relatively high D.C. voltage across the output terminals thereof in response to the application of a relatively low A.C. voltage across the input terminals thereof, first connections between the input terminals of said magnetron and the output terminals of said unit, a block including terminals adapted to be connected to a source of power supply of relatively low voltage A.C., second connections between the terminals of said block and the input terminals of said unit, a control device having a start position imparting relatively high impedance to the input of said unit and having a run position imparting relatively low impedance to the input of said unit, and control means for selectively operating said control device between its start position and its run position.

14. An ultra-high frequency control and power supply system comprising a magnetron including a pair of input terminals and a pair of output terminals, said magnetron being characterized by the production of an A.C. voltage of ultra-high frequency across the output terminals thereof in response to the application of a D.C. voltage across the input terminals thereof, a voltage doubler and rectifier unit including a pair of input terminals and a pair of output terminals, said unit consisting essentially of an assembly of rectifiers and capacitors and being characterized by the production of a relatively high D.C. voltage across the output terminals thereof in response to the application of a relatively low A.C. voltage across the input terminals thereof, first connections between the input terminals of said magnetron and the output terminals of said unit, a block including terminals adapted to be connected to a source of power supply of relatively low voltage A.C., second connections between the terminals of said block and the input terminals of said unit, a control device having a start position imparting relatively high impedance to the input of said unit and imparting relatively high impedance to the output of said unit and having a run position imparting relatively low impedance to the input of said unit and imparting relatively low impedance to the output of said unit, and control means for selectively operating said control device between the start position thereof and the run position thereof.

References Cited

UNITED STATES PATENTS

| | | | |
|---|---|---|---|
| 2,619,525 | 11/1952 | Webb | 328—259 |
| 2,872,573 | 2/1959 | Wilson | 328—270 |
| 3,168,637 | 2/1965 | Lamb | 219—10.55 |
| 3,171,084 | 2/1965 | Sziklai | 328—270 |
| 3,225,302 | 12/1965 | Ojelid | 328—270 |

FOREIGN PATENTS 1,034,556   6/1966   Great Britain.

OTHER REFERENCES

Siemens: German application 1,171,513 printed June 1964 (21 and 2–5/50).

RICHARD M. WOOD, *Primary Examiner.*

L. H. BENDER, *Assistant Examiner.*